United States Patent [19]
Perlman et al.

[11] Patent Number: 5,500,860
[45] Date of Patent: Mar. 19, 1996

[54] ROUTER USING MULTIPLE HOP REDIRECT MESSAGES TO ENABLE BRIDGE LIKE DATA FORWARDING

[75] Inventors: Radia J. Perlman, Acton, Mass.; Alan J. Kirby, Hollis; Floyd J. Backes, Temple, both of N.H.; Charles W. Kaufman, Northborough, Mass.

[73] Assignee: Digital Equipment Corporation, Maynard, Mass.

[21] Appl. No.: 716,027

[22] Filed: Jun. 14, 1991

[51] Int. Cl.$^6$ .................. H04J 3/02; H04J 3/24
[52] U.S. Cl. .................... 370/85.13; 370/94.1
[58] Field of Search .................. 370/85.13, 85.14, 370/85.6, 94.1, 60, 60.1, 94.2, 94.3; 340/825.52, 825.03

[56] References Cited

U.S. PATENT DOCUMENTS

| | | | |
|---|---|---|---|
| Re. 33,426 | 11/1990 | Sugimoto et al. | 370/85.13 |
| 4,621,362 | 11/1986 | Sy | 370/88 |
| 4,707,827 | 11/1987 | Bione et al. | 370/85 |
| 4,797,881 | 1/1989 | Ben-Artzi | 370/94.1 |
| 4,809,265 | 2/1989 | Hart et al. | 370/85 |
| 4,811,337 | 3/1989 | Hart | 370/85 |
| 4,872,162 | 10/1989 | Tanaka et al. | 370/94.1 |
| 4,890,281 | 12/1989 | Balboni et al. | 370/60 |
| 4,933,937 | 6/1990 | Konishi | 370/94.1 |

(List continued on next page.)

FOREIGN PATENT DOCUMENTS

| | | |
|---|---|---|
| 0255767 | 2/1988 | European Pat. Off. . |
| 0357136 | 3/1990 | European Pat. Off. . |
| 0465201 | 1/1992 | European Pat. Off. . |

OTHER PUBLICATIONS

Tai et al. "LAN Interconnection: A Transparent, Shortest–Path Approach," 1991 IEEE, pp. 1666–1670.
Elam et al. "LAN/WAN Internetworking Performance Issues." 1988 IEEE, pp. 187–192.
Spragins et al., Telecommunications Protocols and Design pp. 491–510.
European Search Report dated Sep. 22, 1992, Application No. 92 30 5234.
IEEE Network: The Magazine of Computer Communications, vol. 2, No. 1, Jan. 1988, New York, New York, U.S.A., pp. 49–56. L. Bosack, et.al., "Bridges and Routers, Observations Comparisons and Choosing Problems in Large LANs".
Pending patent application: Ser. No. 07/577,437, filed Sep. 4, 1990, Attorney Docket No. PD990–0094.

*Primary Examiner*—Douglas W. Olms
*Assistant Examiner*—Chau T. Nguyen
*Attorney, Agent, or Firm*—A. Sidney Johnston; David A. Dagg

[57] ABSTRACT

An apparatus for forwarding a data packet from a first link to a second link is disclosed. The apparatus is coupled with a plurality of computer networks through ports on the apparatus. The apparatus maintains a spanning tree list indicating which of the apparatus ports are active. The apparatus receives a packet, and determines if the packet was received from a port that is active. If the packet was received from a port that is not active, the packet is discarded. If the packet is not discarded, the data link source address of the packet is stored in a database within the apparatus for the computer network coupled with the port from which the packet was received. The apparatus then decides, responsive to a contents of a data link destination address field in the packet, whether to forward the packet as a bridge or to forward the packet as a router. If the apparatus forwards the packet as a router, the apparatus sends a redirect message to update the data link layer destination address used by the originating station to contain the data link layer address of the destination station where the destination station is on a link remote from the link of the originating station. For the subsequent packets the apparatus then behaves as a bridge by forwarding the subsequent packets based upon parsing of only the Data Link Header. For forwarding of subsequent packets, the apparatus is advantageously fast, in accordance with bridge operation.

6 Claims, 7 Drawing Sheets

U.S. PATENT DOCUMENTS

| | | | |
|---|---|---|---|
| 4,933,938 | 6/1990 | Sheehy | 370/85.13 |
| 4,941,089 | 7/1990 | Fischer | 370/85.13 |
| 4,947,390 | 8/1990 | Sheehy | 370/85.13 |
| 5,018,137 | 5/1991 | Backes et al. | 370/94.1 |
| 5,088,032 | 2/1992 | Bosack | 370/94.1 |
| 5,088,090 | 2/1992 | Yacoby | 370/85.13 |
| 5,153,876 | 10/1992 | Sin | 370/85.1 |

ROUTER USING MULTIPLE HOP REDIRECT MESSAGES TO ENABLE BRIDGE LIKE DATA FORWARDING

FIELD OF THE INVENTION

This invention relates to forwarding messages from a first link to another link, and more particularly relates to reducing the time required to forward data packets.

BACKGROUND OF THE INVENTION

Communications systems between computers are presently capable of connecting tens of thousands of computers. Typically, a computer will originate a message directed to another computer, and will transmit the message as a sequence of data packets onto the communications system. Because of the large number of computers connected to the system, and the large number of data packets transferred between the computers, congestion of packets on the system is an important problem.

Communications systems are often divided into a number of links. Typically, a link may be a local area network, where each local area network is capable of supporting a few hundred computers. A local area network will hereinafter be referred to as a LAN. The LANs are connected together by a number of different standard devices which forward packets. With the increasingly large size of modern communications systems, the time required to forward a data packet between LANs becomes an important parameter of system design.

Other types of links in a communications system may be, for example, a wide area network formed by joining other links such as LANs, a point to point connection between computers, etc. Congestion of system packet traffic is also an important problem in all link-to-link connections. Also, all types of links may be connected together by standard devices.

Before discussing standard devices used to connect links together, data packets and the headers of data packets added by different layers of the communications protocol must be discussed. A data packet is typically formed in a higher level of the communications protocol, and finally is transferred down to the Transport Layer which passes the packet into the Network layer. The Network layer attaches a header, the Network Layer Header, to the data packet, and then passes the packet into the Data Link Layer. The Data Link Layer then attaches a header, the Data Link Layer Header, to the data packet. The packet is then transmitted onto the communications system by the physical layer.

A packet, once transmitted onto the communications system, is then forwarded from link to link until it reaches its destination end station.

A first type of device connecting links of the communications system is a bridge. A bridge operates in the Data Link level of the communications protocol, which is the level immediately above the physical level. A bridge receives data packets from one link, typically a LAN, and then parses the Data Link Header. The bridge then makes a decision on what to do with the data packet, where the decision is based upon the contents found in the Data Link Header.

A second type of device linking LANs is a router. A router operates in the network layer, a layer above the data link layer. A router operates by parsing both the Data Link Header and the Network Layer Header, and making decisions based on the contents of both headers. Further, fields of the Network Layer Header are of variable length, and so the router must read the length of the variable fields from a field of the header, and then make parsing decisions based upon the indicated length. Accordingly, a router is slower than a bridge because it must parse an additional header, and must make more decisions based on the contents of the additional header, than does a bridge.

In some designs a bridge may be on the order of 200 times faster than a router in forwarding a data packet from a first link to a second link.

Even though a router is slower in forwarding packets from one link, such as a LAN, to another link, it is necessary to use routers rather than bridges at certain locations between multiple numbers of links. The router performs functions beyond those of a bridge, such as: forwarding along better routes than a bridge; incrementing a "hop count" field of a forwarded packet to show the number of passes of the packet through a router in order to prevent indefinite looping of the packet; preventing certain management traffic such as "hello" messages from end stations on one link from being forwarded to the other link; maintaining "network layer addresses" of stations on the links that it connects; fragmentation and reassembly of packets because of different protocols employed by different links; performing explicit handshaking protocols with end stations connected to links connected to the router; participating in routing algorithms, and other functions.

However, a difficulty in operation of large computer communications networks is that the time required for a router to forward messages may unduly decrease throughput on the communications system.

SUMMARY OF THE INVENTION

The invention is an apparatus for forwarding packets, and solves the difficulty of a router requiring too much time for forwarding a packet.

An apparatus for forwarding a data packet from a first link to a second link, has a first means for parsing a data link destination address field of a packet to be forwarded, and has a second means, responsive to a content of the data link destination address field as determined by the parsing, for deciding whether to forward the packet as a bridge or to forward the packet as a router. Further, the apparatus sends a redirect message to update the data link layer destination address used by the originating station to contain the data link layer address of the destination station where the destination station is on a link remote from the link of the originating station.

When a first data packet is forwarded from a first link to a second link, the apparatus behaves as a router by forwarding based upon parsing the Network Layer Header. The apparatus then passes the data link address of the receiving end station to the transmitting end station. Subsequent packets sent by the transmitting end station to the receiving end station then have the data link address of the receiving end station written into the Data Link Destination address field of the Data Link Header of the packet. For the subsequent packets the apparatus then behaves as a bridge by forwarding the subsequent packets based upon parsing of only the Data Link Header. For forwarding of subsequent packets, the apparatus is advantageously fast, in accordance with bridge operation.

An apparatus is provided for forwarding a packet from a first LAN to a second LAN. The apparatus is of the type capable of receiving a packet transmitted by a transmitting end station where the packet is sent to a receiving end station and the packet contains a data link address of the apparatus. The apparatus is capable of writing a second data link address into the packet and forwarding the packet to a second LAN.

The apparatus has a means for notifying the transmitting end station of a second data link address. The transmitting end station has a means, responsive to the notification, for the transmitting end station to transmit a subsequent packet having the second data link address in the subsequent packet. The apparatus has a means, responsive to the second data link address being included in the subsequent packet, for the apparatus to forward the subsequent packet to a station having the second data link address, where the forwarding of the subsequent packet is bridge type forwarding.

Further, when the receiving end station is on a LAN that is separated by several LANs, connected together by routers, from the LAN having the transmitting end station, the data link address of the receiving end station is sent to the transmitting end station. Subsequent packets sent by the transmitting end station are then forwarded between the intermediate LANs by the invention behaving as a bridge, and so the forwarding is advantageously fast.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Summary Description

Capitalization will be used in this document to highlight names of fields of a packet, in order to improve readability of the document.

Figure 1:
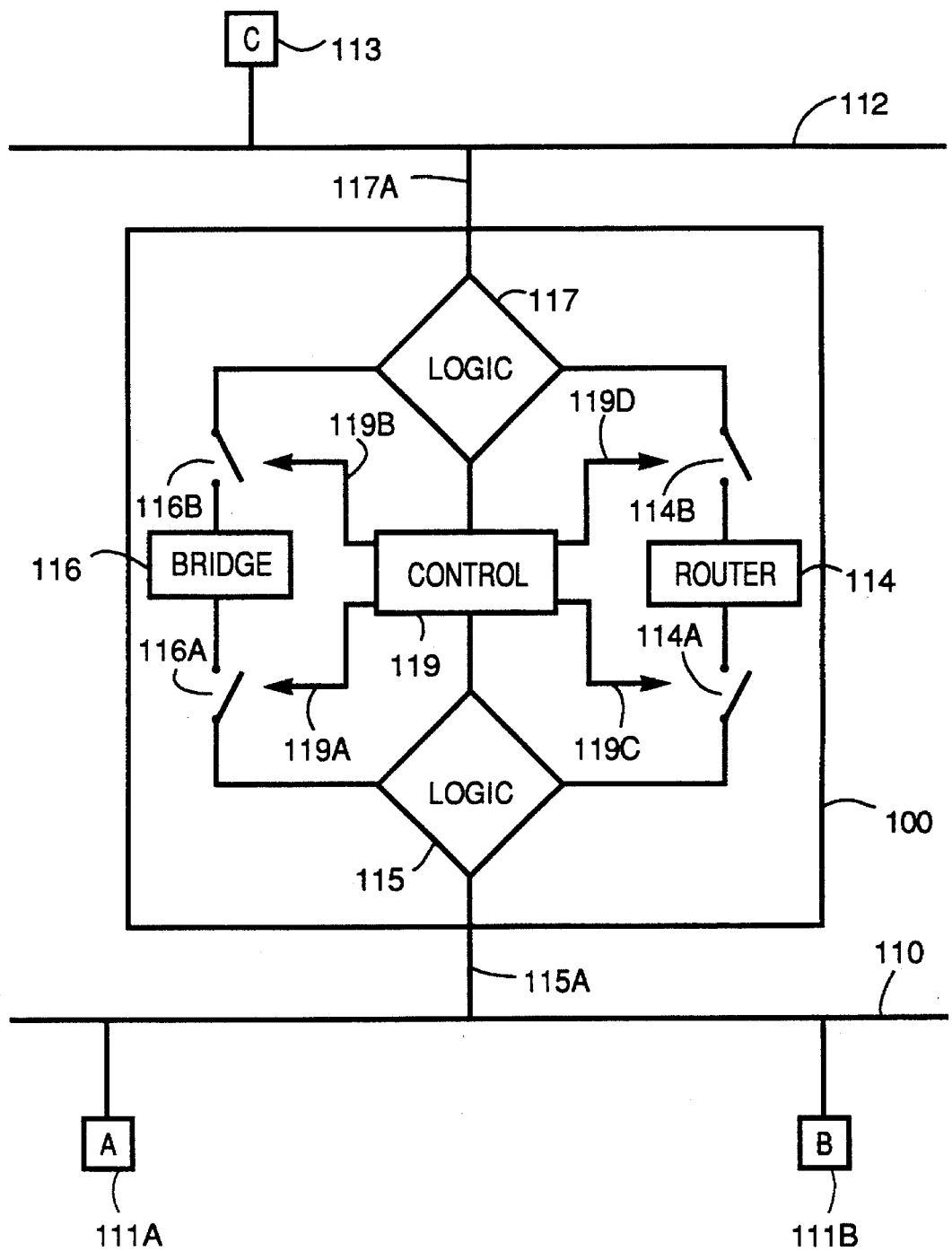
FIG. 1 is a logic diagram of two LANs connected by the invention.

Referring now to FIG. 1, there is shown a communications link connection apparatus 100, a "brox", in accordance with the invention. The term "brox" is coined herein, and is defined as a box for connecting communications links in accordance with the present invention. A brox forwards as a router under certain conditions, but under other conditions forwards as a bridge. The word "brox" is an acronym constructed from the capitalized letters (Bridge Router bOX) for a box that behaves as a bridge or as a router. Also a brox may have behavior modes that are neither those of a standard bridge nor those of a standard router.

For communications between end stations on a single LAN, a router creates redirect messages for the originating station. A redirect message is defined for stations on a single LAN as a message which a router sends to an end station giving the end station an alternative data link layer address to which the end station may send future packets. In the event that the end station accepts the redirect message and uses the alternative data link layer address, which, for example, is the data link layer address of the destination station, then communications on that LAN are enhanced.

The protocol requires that an originating end station know the network layer address of a destination end station, but that the originating end station know only the data link layer address of a router connected to the link, and that the originating end station need not know the data link layer address of the intended destination station. The redirect message speeds communications on that LAN because the protocol further requires that when a router is connected to a LAN, the stations on that LAN send a first packet intended for another station on that LAN to the data link layer address of the router. And then the router both forwards the packet onto the same LAN and sends a redirect message to the originating station.

For a multiple hop data packet transmission, operation of the invention can be described in simple terms as follows: a data packet from a sending end station to a receiving end station generates a corresponding redirect message from a first brox to the sending end station. The redirect message tells the sending end station to use the data link address of the next brox. The second data packet generates a redirect message from the second brox, where the redirect message tells the sending end station to use the data link address of the next brox. And finally the last brox sends a redirect message telling the sending end station to use the data link address of the receiving end station. The broxs function as routers when a data packet is addressed to the data link address of the brox. However, the broxs function as bridges when the Data Link Destination Address field of the data packet does not contain a data link address of the brox.

A significant benefit of the invention is that, once the sending end station learns the data link address of the receiving end station, forwarding of later sent data packets is at bridge speed, rather than router speed. The forwarding delay at each brox my be as much as 200 times less when the brox functions as a bridge rather than as a router.

The invention greatly speeds forwarding of data packets.

FIRST EXEMPLARY EMBODIMENT

Referring again to FIG. 1, there is shown generally a communications system 101. Local Area Network (hereinafter referred to as LAN) 110 is coupled to LAN 112 by brox 100. LAN 110 has end station A 111A and end station B 111B. LAN 112 has end station C 113C. Both Local Area Networks, 110 and 112, may have additional end stations that are not shown in FIG. 1, and each LAN may, for example, each support as many as several hundred end stations.

Brox 100 forwards traffic generated on LAN 110 to LAN 112, and also forwards traffic generated on LAN 112 to LAN 110.

The internal connections of brox 100 are logically represented in FIG. 1.

A packet arriving at brox 100 may produce any one of a plurality of results, for example: the packet may be forwarded onto a link different from the originating link; or the packet may be forwarded onto the originating link; or the packet may be processed internally by the router and not forwarded, or for further examples, packets may be discarded and not forwarded.

By way of example, a packet arriving from LAN 110 enters brox 100 on line 115A where it is first processed by logic 115. In the event that the packet is to be forwarded by the brox behaving as a bridge, then logic 115 and control 119 close switch 116A by control line 119A and close switch 116B by control line 119B. Also logic 115 and control 119 open switch 114A by control line 119C and open switch 114B by control line 119D. The packet then progresses through brox 100 by being forwarded by bridge 116, and passes through logic 117 and line 117A onto LAN 112.

In the event that a packet arrives from LAN 100 on line 115A, and logic 115 determines that the packet is to be forwarded by brox 100 functioning as a router, then logic 115 and control 119 close switch 114A by control line 119C and close switch 114B by control line 119D. Also logic 115 and control 119 open switch 116A by control line 119A and open switch 116B by control line 119B. The packet is then forwarded by router 114 and leaves brox 100 by passing through logic 117 and line 117A.

In the further case that a packet enters brox 100 from LAN 112 on line 117A, and logic 117 determines that brox 100 is to forward the packet with brox 100 functioning as a bridge, then logic 117 and control 119 close switch 116B by control line 119B and close switch 116A by control line 119A. Also logic 117 and control 119 open switch 114B by control line 119D and open switch 114A by control line 119C. The packet then is forwarded by bridge 116 and leaves brox 100 through logic 115 and line 115A.

In the still further case that a packet enters brox 100 from LAN 112 on line 117A, and logic 117 determines that brox 100 is to forward the packet by functioning as a router, then logic 117 and control 119 close switch 114B by control line 119D and close switch 114A by control line 119C. Also logic 117 and control 119 open switch 116B by control line 119B and open switch 116A by control line 119A. The packet is then forwarded by router 114, and passes through logic 115 and leaves brox 100 on line 115A.

Switches 114A 114B 116A and 116B are operated by control 119, in cooperation with logic 115 and logic 117, on a packet by packet basis. Accordingly, brox 100 processes packets arriving from either LAN 112 or LAN 110 by forwarding them as either a bridge or as a router, as required.

Figure 2:
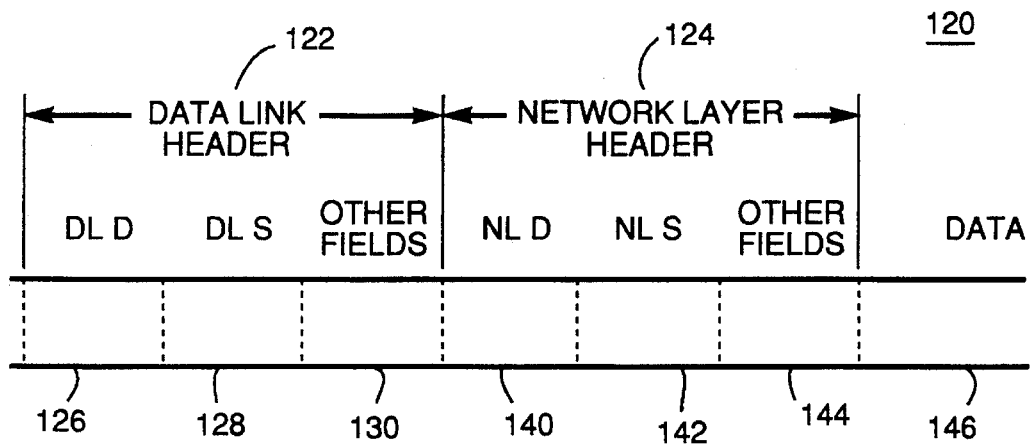
FIG. 2 is a field diagram of a data packet in accordance with the invention.

Referring now to FIG. 2, there is shown a typical field structure for a data packet used by an end station of a LAN 110, 112 shown in FIG. 1. Data packet 120 is shown having a Data Link Header 122 and a Network Layer Header 124. When data packet 120 is created and transmitted onto a LAN, the network layer attaches Network Header 124 to the packet, and then the packet is handed down to the data link layer. The data link layer then attaches the Data Link Header 122 to the packet. Upon transmission, data packet 120 may have additional fields preceding the Data Link Header 122 such as, for example, preamble fields, and the precise structure of such preamble fields will depend upon the standard to which LAN 110 is designed. Such preamble fields are not shown in FIG. 2, as FIG. 2 focuses on those fields used by the invention.

Data Link Header 122 is shown in FIG. 2. Data Link Header 122 contains Data Link Destination Address field 126, and Data Link Source Address field 128, as also shown in FIG. 2. Other Data Link Header fields 130 are also shown in FIG. 2, but are not further described herein in that the invention focuses on the Data Link Destination Address field 126 and the Data Link Source Address field 128 of the Data Link Header 122. Data Link Destination Address field 126 is abbreviated DL D. Data Link Source Address field 128 is abbreviated DL S. Many LANs are constructed in accordance with a standard LAN specification. Examples of standard LAN specifications are: the IEEE 802 family of specifications, the IEEE 802.3 Ethernet bus using CSMA/CD, the IEEE 802.4 token bus, the IEEE 802.5 token ring, and the IEEE 802.2 data link layer; the ANSI Fiber Distributed Data Interface, FDDI; the ARPA Net TCP/IP; and many others. In many standard specifications for a LAN, the Data Link Destination Address field 126 is defined as 6 octets, and also the Data Link Source Address field 128 is defined as 6 octets. In a system that uses 8 bits for a byte, an octet and a byte are the same. Some systems may use other than 8 bits for a byte, and in that event the definition used for many LAN specifications is that the Data Link Destination Address field 126 and Data Link Source Address field 128 are defined as 6 octets each, where an octet is 8 bits. Also, the precise definition of Data Link Header "other" fields 130 will depend upon the standard to which the LAN 110 is designed.

Normal operation of a bridge and normal operation of a router will now be described.

Bridges

The Data Link Header 122 contains a number of fields, and the fields principally used by the bridge are: the Data Link Destination Address field 126; and, the Data Link Source Address field 128 (FIG. 2).

The bridge compares the address found in the Data Link Destination Address field with a forwarding table maintained in a database contained in the bridge, and also compares the contents of the Data Link Source Address field of the packet with a list of source addresses maintained for each link connected to the bridge. The bridge then, typically, makes forwarding decisions based upon the contents of these fields.

Typical design rules for operation of a bridge are as follows, and include both rules for receipt of a packet and rules for forwarding a packet.

For receipt of a packet, a bridge tests the contents of the Data Link Destination Address field of the packet against internally maintained forwarding tables.

For forwarding, the bridge decides what to do with the packet, for example, as follows. Typically, for a bridge that uses the flooding and backward learning algorithm, the bridge makes the following decisions, based upon the contents of the Data Link Destination Address field of the packet: if the packet Data Link Destination Address is in the forwarding table of a link attached to the bridge, then forward the packet to the proper link, except, if the packet destination is on the link from which the packet originated, then disregard the packet; and, if the destination address is not in the forwarding table, then flood the packet to all of the links connected to the bridge, but not the link from which the packet originated. Also, typically, a bridge forwards packets having certain multicast or broadcast addresses in their Data Link Destination Address field, such as end station hello messages. A bridge attempts to make the links that it joins together operate as an extended LAN.

Also, if the content of the Data Link Source Address field of the packet is absent from the bridge forwarding tables, then the bridge adds to its appropriate forwarding table a correlation between the address contained in the Data Link Source Address field of the packet and the link from which the packet arrived. Any subsequent packets addressed to that address are then forwarded onto the correlated link. By updating its forwarding table using the arrival link of unknown packets, a bridge learns the correlation between arrival links and the source address of end stations either on those links or connected to those links from other links, and thereby builds up entries into its forwarding tables. Further, for example, there are many other ways that entries in in a bridge forwarding table may be compiled.

In addition to receiving and forwarding packets, bridges perform additional functions. For example, a bridge may have a plurality of ports in excess of two ports, where each port may, for example, be connected to a different link. And the bridge may turn off selected links in order to prevent looping of packets in a topologically complex communications network.

Routers

A router makes forwarding decisions based upon the content of the Network Layer Header 124 fields, and uses principally the Network Layer Destination Address field 140 and the Network Layer Source Address field 142 (FIG. 2). Also, a router must parse and read a field giving the lengths of the address fields, and then interpret the address fields based upon the contents of the length indicator fields. The length indicator fields are in the other fields 144. Other Network Layer Header fields are used by a router, however, at present we discuss only the decisions made by the router based upon these two address fields 140, 142.

Typically, an end station informs a local router what both the data link address and the network layer address of the end station is.

For receipt of a packet, typically a router receives a packet if: the Data Link Destination Address field contains the data link address of the router; or if the Data Link Destination Address field contains certain broadcast destination addresses, which are not presently of concern.

Also, typically, a router forwards a packet that it has received: to an end station if the end station is on a link, such as a LAN, connected to the router; or, to another router, and that router is chosen from a list by comparing the Network Layer Destination Address field of the packet with an entry in a forwarding table maintained by the receiving router, and sending the packet to the appropriate router.

For example, routers use the routing protocol in order to exchange explicit routing information amongst routers, and that information is used by each router to construct a forwarding database. The forwarding database consists of an association between network layer destination addresses, and forwarding information. The forwarding information consists of a link to forward the packet on, combined with a data link address to forward the packet to.

As a second example, the router forwarding table is typically built up by messages sent between routers, where a message from a router carries a list of network layer addresses of end stations on a LAN connected to the router. Typically, messages between routers may be link state packets, as are familiar to those skilled in the art.

Data packet traffic between end stations and a router, such as end station "hello" traffic, informs the router of the data link addresses of the end stations, and also the network layer address of the end station. The router then builds up a table for each link to which the router is directly attached showing the data link addresses of all end stations attached to that link. The router does not forward the hello traffic, and so is able to build up a table for each link showing the end stations attached to that link.

Routers exchange router "hello" messages. From the router hello traffic, routers learn the identity, including the data link source address of other routers in the communications network. Routers then exchange messages by which they inform other routers of the end stations that they service. From the messages received from other routers, a particular router learns which router to send a message to, where the message has a particular network layer destination address in the packet Network Layer Destination Address field.

From the router to router traffic, a router constructs a forwarding table correlating end station network layer addresses with a data link address of an appropriate router, and forwards a packet accordingly.

Another typical function of a router connected to a link such as a LAN is to operate a redirect protocol, such as the redirect protocol set out in the International Standards Organization standard ISO 9542. In standard ISO 9542, when a LAN that has a router connected into the LAN is first powered up, then the end stations and the router learn each others data link addresses through hello packets. When one end station on the LAN sends a first packet to another end station on the LAN, the packet is sent with the router data link address in the Data Link Address Field of the packet. The router then forwards the packet to the receiving end station, where the forwarding is based on the contents of the Network Layer Destination Address field of the packet. The sending end station learned the Network Layer Destination Address of the desired receiving end station from management traffic generated by the router.

After forwarding the packet with the Data Link Layer field containing the data link destination address of the desired receiving end station, the router then sends a redirect message to the sending end station. The redirect message causes the sending end station to write into an internal database of the sending end station a correlation between the network layer address of the receiving end station and the data link address of that station. The next data packet that the sending end station sends to the same receiving station is then sent with the data link address of the receiving station in the Data Link Destination Address field of the packet, rather than sending the packet to the router. A result of this redirect protocol is that traffic on the local LAN is improved, because after the first packet goes to the router, all subsequent packets go directly to the desired receiving end station. This redirect protocol works because both the sending end station and the receiving end station are on the same LAN.

Routers perform other functions not directly related to the present invention, such as: running routing protocols in order to decide on routes to maintain between links when there are choices of multiple routes, that is, participating in routing algorithms; isolating links, by, for example, preventing certain management traffic such as end station hello messages on one link from being forwarded to another link; fragmentation and reassembly of packets because of different protocols employed by different links; performing explicit handshaking protocols with end stations connected to links connected to the router; and other functions.

Figure 1A:
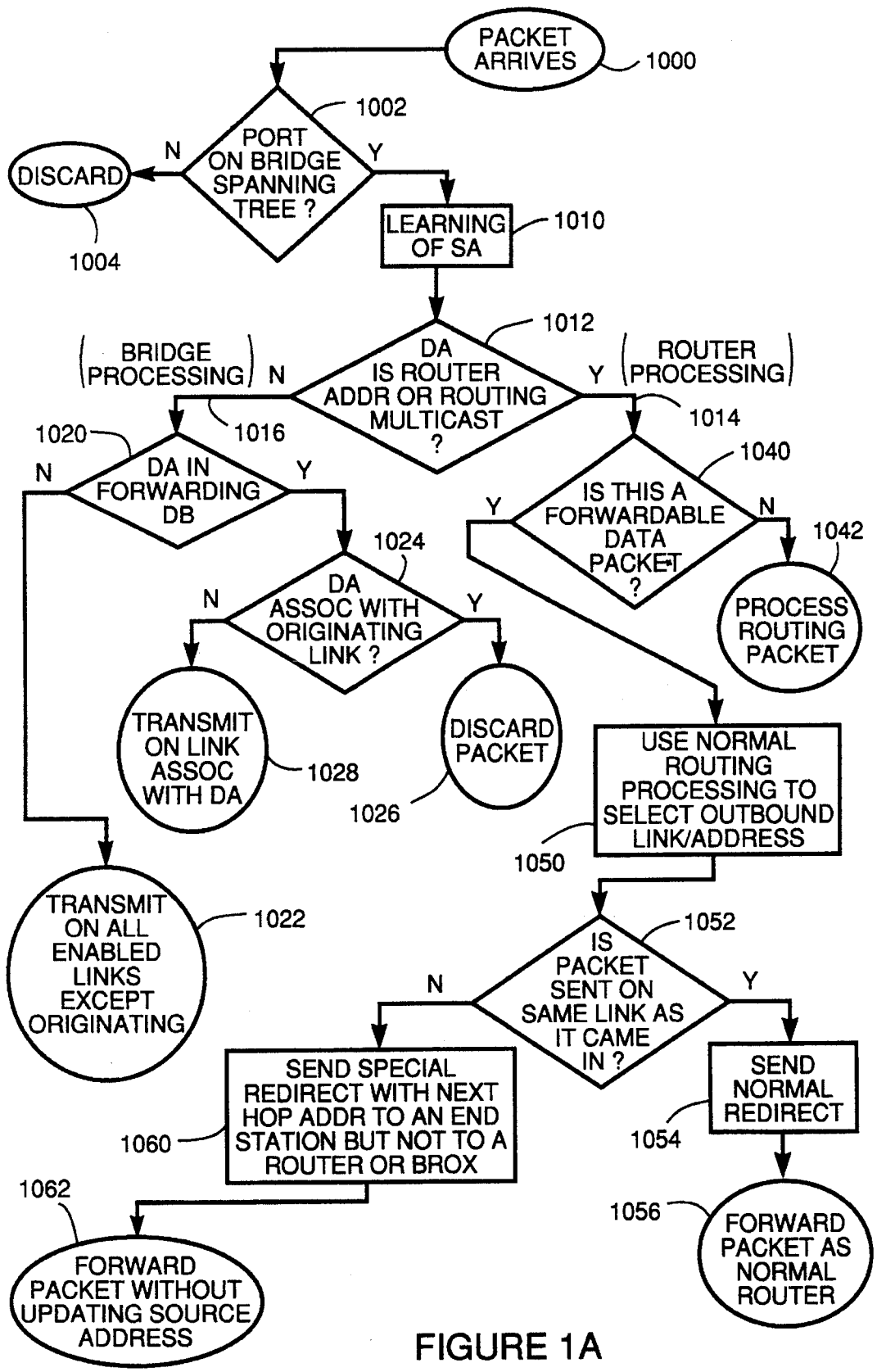
FIG. 1A is a flow chart for operation of a brox in accordance with the invention.

Turning now to FIG. 1A, there is shown a flow diagram of the operation of brox 100. At block 1000 a packet arrives at brox 100. The packet may arrive on line 115A from LAN 110, or the packet may arrive on line 117A from LAN 112.

Processing of the packet from block 1000 proceeds to decision block 1002 where the arrival port is tested in order to determine whether or not the arrival port is on the bridge spanning tree. For example, a brox may have more than two ports, and some of the ports may be activated by being on the bridge spanning tree. Other ports may be inactivated by not being on the bridge spanning tree. In the event that the arrival port is not on the bridge spanning tree, then decision block 1002 answers "no" and control passes to block 1004 where the packet is discarded. The link from which the packet arrives at brox 100, and begins processing at block 1000, is referred to hereinafter as the "originating link".

In the event that decision block 1002 answers "yes", the port is on the bridge spanning tree, then control passes to block 1010. At block 1010 the brox determines the contents of the Data Link Source Address field DL S 128 of the arriving packet, and stores the contents in the bridge forwarding database associated with the originating link. Control then passes to decision block 1012. At decision block 1012 the contents of the packet's Data Link Destination Address field DL D 126 is determined, and is stored as the packet data link destination address. The packet data link destination address is tested in order to determine if it is a router address or a routing multicast address. In the event that decision 1012 block answers "yes", then control passes to line 1014 for router processing. In the event that decision block 1012 answers "no", then control passes to line 1016 for bridge processing.

Bridge processing is next discussed. Control flow along line 1016 is directed to decision block 1020 where the packet data link destination address is tested against the forwarding data base maintained by the bridge. In the event that the packet data link destination address is not in the bridge forwarding data base, then decision block 1020 answers "no" and control passes to block 1022. At block 1022 the packet is transmitted onto all enabled links except the originating link. In the event that decision block 1020 answers "yes", the packet data link destination address is in the bridge forwarding data base, then control passes to decision block 1024.

At decision block 1024 the packet data link destination address is tested in order to determine if the destination station is on the originating link. In the event that decision block 1024 answers "yes", the destination station is on the originating link, then control passes to block 1026 and the packet is discarded. In the event that decision block 1024 answers "no" then control passes to block 1028 where the packet is transmitted onto the link associated with the packet data link destination address.

Router processing from line 1014 is now discussed. In the event that decision block 1012 answered "yes", the packet data link destination address is a router or routing multicast address, then control passes along line 1014 to decision block 1040. At decision block 1040 the packet is tested in order to determine if the packet is a "forwardable data packet". In the event that decision block 1040 answers "no", then control passes to block 1042 where the packet is processed internally by the router. In the event that decision block 1040 answers "yes", this is a forwardable data packet, then control passes to block 1050 where a normal routing process is used to select both an outbound link and a packet data link layer address for Data Link Destination Address field DL D 126 of the outgoing packet. Control then passes to decision block 1052.

At decision block 1052 the new packet data link destination address, determined by block 1050, and the outbound link, also determined by block 1050, are tested in order to determine if the packet outbound link is the originating link. In the event that decision block 1052 answers "yes" the outbound link is the same as the originating link, then control passes to block 1054. At block 1054 a normal redirect message packet is sent to the originating station, and then control passes to block 1056. At block 1056 the packet is forwarded by brox 100 functioning as a normal router.

In the event that decision block 1052 answers "no", the outbound link is not the originating link, then control passes to block 1060. Accordingly, the packet will be forwarded to the outbound link as a "hop" to a new link. Also at block 1060 the Data Link Source Address field DL S 128 of the packet is examined in order to determine if the station sending the packet is an end station, or alternatively is a router or a brox. A redirect message is sent to an end station, but in contrast, no redirect message is sent to a router or a brox. In the event that the station sending the packet was an end station, then at block 1060 brox 100 creates a special redirect message to the originating station, the special redirect message is sent to the originating station, and control passes to block 1062. The special redirect message is received by the originating station as a normal redirect message so that the originating station will use the "next hop" data link address in the Data Link Destination Address field DL D 126 in the next packet that the originating station sends to the station identified in the packet Network Layer Destination Address field 140 of the present packet.

At block 1062 the brox 100 forwards the packet onto the outbound link determined at block 1050 with brox 100 functioning as a normal router.

As an alternative example the packet may be forwarded at block 1062 without updating the Data Link Source Address field 128 of the packet. The consequence of not updating the Data Link Source Address field 128 of the packet is that at each succeeding hop in a multihop transmission, the special redirect message generated at block 1060 will be generated by each brox, and will update the originating station data link destination address at each brox forwarding event. In this alternative example, the cumulative result of all forwarding events in a multihop transmission, is that upon the arrival of the first packet at the intended destination station, the data link address of the originating station will be updated to contain the data link layer address of the intended destination station. This alternative example is further discussed hereinbelow as the Third Exemplary Embodiment.

Returning now to a description of the operation of brox 100, a sequence of packets sent by end station A 111A to end station C 113C will now be traced.

Figure 3:
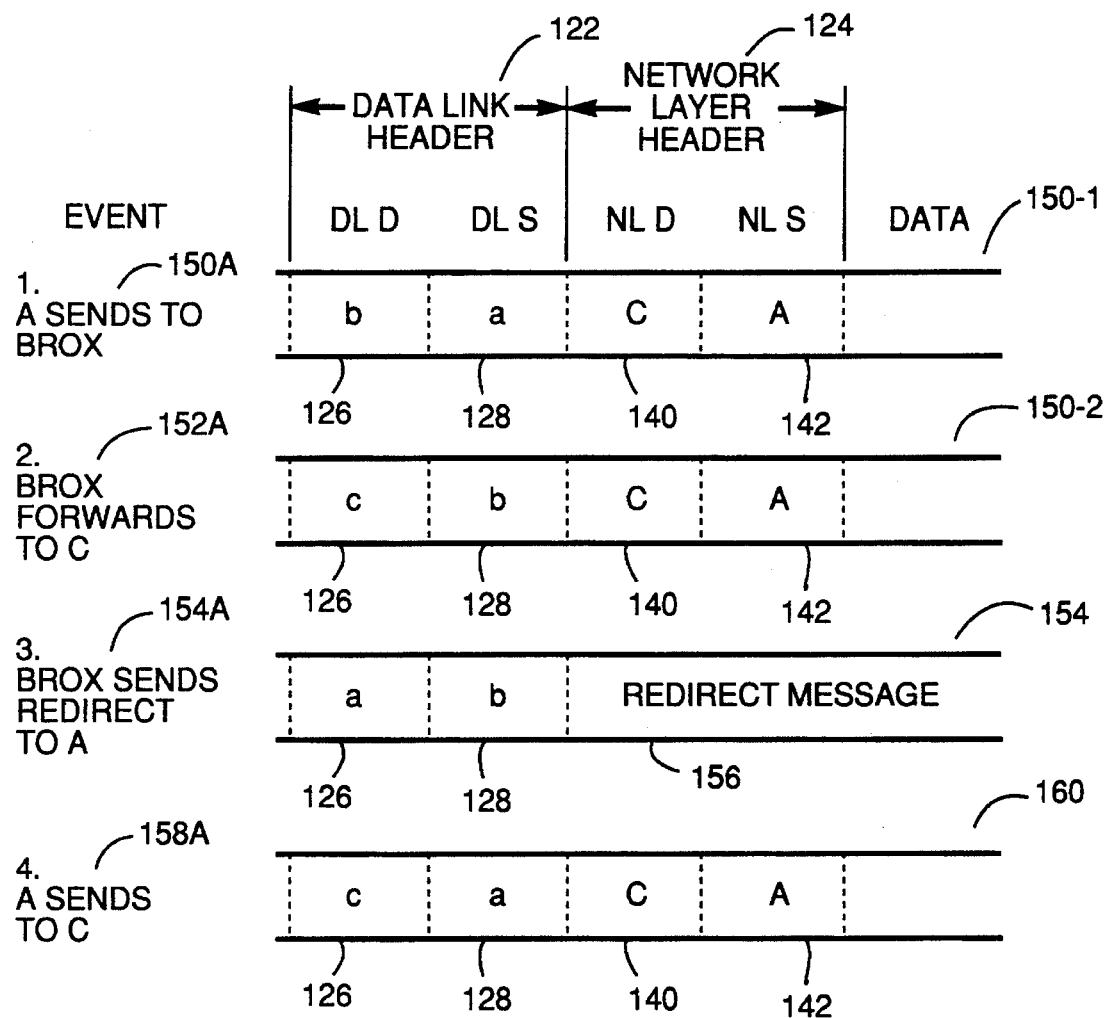
FIG. 3 is a sequence of packets in accordance with the invention.

Referring now to FIG. 3, there is shown a sequence of packets along with the operation of brox 100, as brox 100 forwards the packets from end station A 111A to end station C 113C.

End station A 111A on LAN 110 sends a data packet to end station C 113C on LAN 112. The first step in end station A 111A sending a data packet to end station C 113C is shown as event # 1 150-1 A, where end station A transmits data packet 150-1 onto LAN 110.

Each end station has a data link address and a network layer address. Referring again to FIG. 1, the data link address of an end station is represented by a "lower case" letter designating the end station. That is, the data link address on LAN 110 of end station A 111A is represented by the symbol "a", the data link address on LAN 110 of brox 100 is represented by the symbol "b", and the data link address of end station C on LAN 112 is represented by the symbol "c".

In contrast, the network layer address of a station is represented by a "capital letter" designating the end station. That is, the network layer address on LAN 110 of end station A 111A is represented by the symbol "A", the network layer address on LAN 110 of brox 100 is represented by the symbol "B", and the network layer address of end station C 113C on LAN 112 is represented by the symbol "C".

End station A 111A, at event # 1, sends data packet 150-1 to brox 110. The fields in data packet 150-1 contain the following: Data Link Destination Address field 126 contains b; Data Link Source Address field 128 contains a; Network Layer Destination Address field 140 contains C; and Network Layer Source Address field 142 contains A.

At event # 2 152A, brox 100 receives data packet 150-1 because the Data Link Destination field of data packet 150-1 contains "b", the data link address of brox 100. Because the data packet 150-1 was addressed to brox 100, brox 100 operates as a router, using router portion 114, and transmits the data packet, shown with reference numeral 150-2, to end station C 113C. The router 114 portion of brox 100 parses the Network Layer Header 124 of data packet 150-1, reads the Network Layer Destination Address field 140 where it finds "C", and then uses its forwarding database to associate the data link destination address "c" as the correct data link destination address. The fields of data packet 150-2 contain the following: Data Link Destination Address field 126 contains c; Data Link Source Address field 128 contains b; Network Layer Destination Address field 140 contains C; and Network Layer Source Address field 142 contains A.

At event # 3 154A brox 100 transmits a redirect message packet 154 to end station A 111A. The fields of the redirect message packet 154 contain the following: Data Link Destination Address field 126 contains a; Data Link Source Address field 128 contains b, and other fields contain the redirect message 156. The layout of the fields containing the redirect message depend upon the standard to which LAN 110 is designed. A redirect message, in accordance with some standard designs, may not have a network layer header, and so no network layer header fields are shown in redirect message packet 154. The redirect message packet 154 may, for example, have the standard form of an ISO standard 9542 redirect message, as discussed hereinabove in the section on routers.

End station A 111A receives the redirect message packet 154 because the Data Link Destination Address field 126 contains "a", the data link address of end station A 111A. The redirect message 156 is interpreted by end station A so that end station A stores, in an internal database, a correlation between the network layer address "C" of end station C 113C and the data link address "c" of end station C 113C. The correlation between the data link address and the network layer address for end station C 113C, as stored in end station A 111A, is then used by end station A 111A for the next packet that end station A 111A transmits to end station C 113C.

At event # 4 158A end station A 111A transmits a further data packet 160 to end station C 113C. The fields of data packet 160 contain the following: Data Link Destination Address field 126 contains c; Data Link Source Address field 128 contains a; Network Layer Destination Address field 140 contains C; and Network Layer Source Address field 142 contains A. Brox 100 detects the Data Link Destination Address field 126 containing the address c of end station C 113C. Brox 100 then functions as a bridge, by opening switch 114A and closing switch 116A, and bridges data packet 160 onto LAN 112. Brox 100 parses only the Data Link Header 122 of data packet 160, and so this bridge forwarding is significantly faster than the router forwarding of the first data packet 150-1.

Forwarding rules followed by brox 100 may be summarized as follows:

1. in the event that the brox recognizes the address found by parsing the Data Link Destination Address field of a packet, then receive the packet and function as a router.

2. in the event that the received data packet is forwarded to a designated data link address found in a forwarding database of the router portion of the brox, then send a redirect message to the source end station.

The redirect message tells the source end station to use the designated data link address for packets that the end station sends to the network layer address found by the brox in the Network Layer Destination Address field of the packet. Whether the source end station adopts or ignores the redirect information is up to the source end station.

2a. but send no redirect message if the Data Link Source Address field of the data packet is the address of a router or brox.

3. in the event that the brox does not recognize the destination address found by parsing the Data Link header as an address of the brox, then bridge the packet.

The bridge portion of the brox may recognize the address found in the Data Link Header and so be able to forward the packet onto the proper link, or may have to flood the packet onto all links, or may follow some other bridging algorithm. In any event, the bridge portion of the brox parses only the Data Link Header of the data packet. Additional forwarding rules, and also exceptions to both the above rules and any new rules, may be needed, depending upon the standards to which the two links are designed.

The forwarding rules are applied by decision block 115. In the event that the decision is for brox 100 to forward as a router, then switch 116A is opened, switch 114A is closed, and the incoming packet is sent on line R 115-1 by decision block 115.

In the event that the decision is for brox 100 to forward as a bridge, then switch 114A is opened, switch 116A is closed, and the incoming packet is sent on line B 115-2 by decision block 115.

SECOND EXEMPLARY EMBODIMENT

In a second exemplary embodiment, a sequence of data packets transmitted over multiple hops will be described. The restriction of Rule 2a above will play a role in multiple hop forwarding. A "hop" for a data packet is a journey from a first router or bridge to a second router or bridge.

Figure 4:
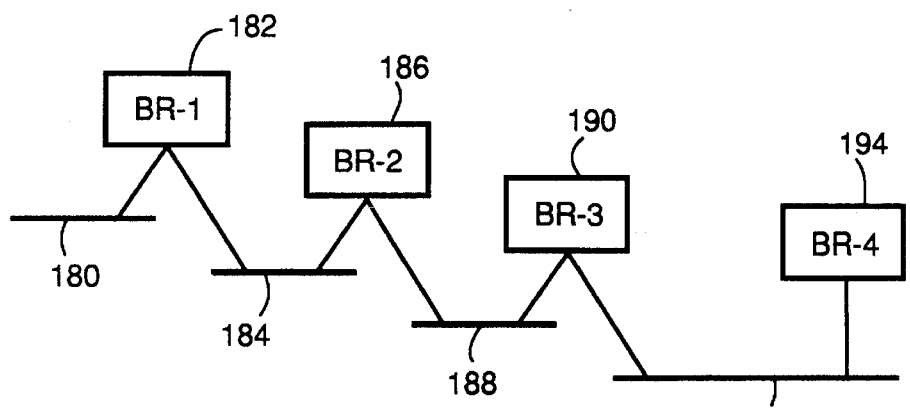
FIG. 4 is a logic diagram of multiple LANs connected in accordance with the invention.

Referring now to FIG. 4, a sequence of LANs are connected by broxs. LAN 180 is connected by brox BR-1 182 to LAN 184. LAN 184 is connected by brox BR-2 186 to LAN 188. LAN 188 is connected by brox BR-3 190 to LAN 192. LAN 192 has brox BR-4 194 connected thereto, and brox BR-4 may connect to still another LAN. Alternatively, brox BR-4 could connect to a communications link to a distant LAN, and thereby form a wide area network. The distant LAN could also be connected to even further broxs and other LANs, and by communication links to even more further distant LANs to provide a large wide area network communications system.

Figure 5:
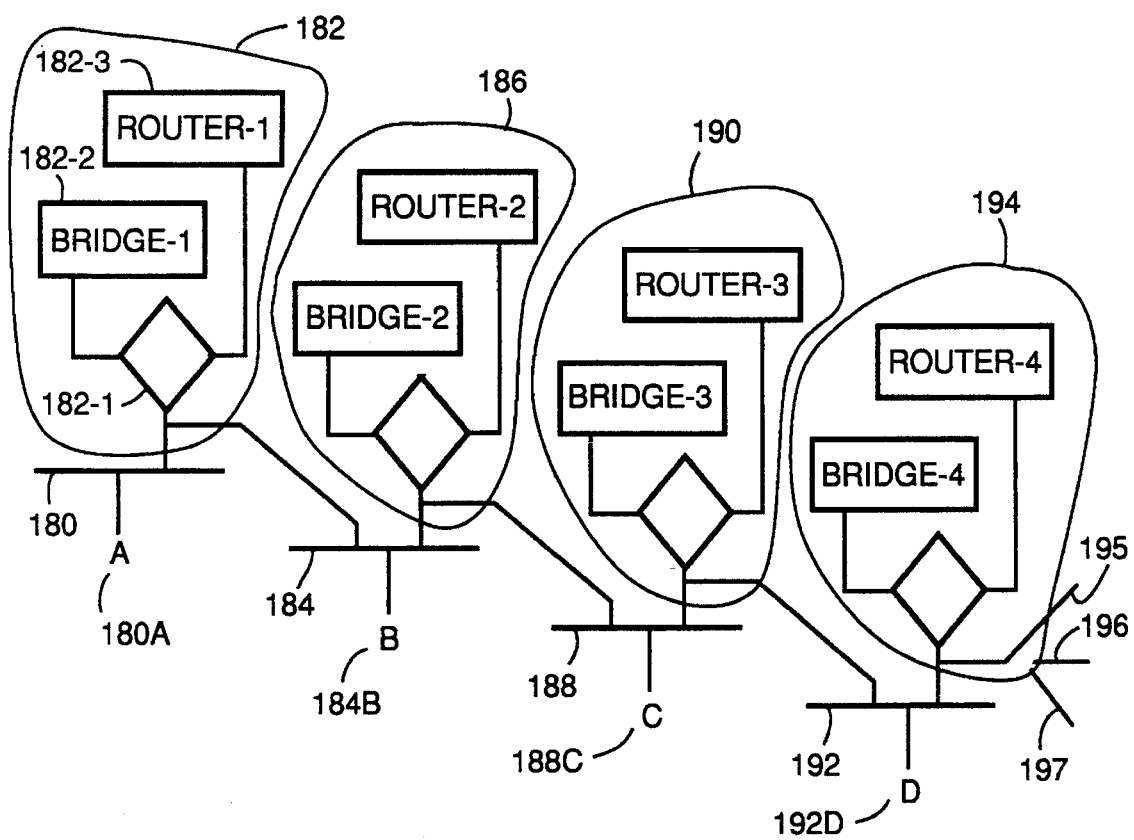
FIG. 5 is a logic diagram of multiple LANs connected in accordance with the invention.

A further alternative arrangement, shown in FIG. 5 at brox 194, is for a brox to connect to more than two links. For example, a brox may connect three or more links 195, 196, 197. Each link 195, 196, 197 may be a different type of link, for example, a LAN, a wide area communications link, etc. Then when forwarding as a bridge the brox either forwards the packet on a known link, or floods the links, except for the arrival link, with the packet, or uses some other bridge protocol. Likewise, when a brox is connected to three or more links and is forwarding as a router, the brox uses the route chosen by a routing algorithm that the router portion of the brox participates in.

Referring again to FIG. 5, each brox shown in FIG. 4 is shown as comprising a decision block, a bridge, and a router.

For example, brox 182 comprises decision block 182-1, bridge 182-2, and router 182-3.

Also, in FIG. 5 each LAN is shown having one end station, for example, LAN 180 has end station A 180A, LAN 184 has end station B 184B, LAN 188 has end station C 188C, and LAN 192 has end station D 192D. Each LAN 180, 184, 188, 192 could support many other end stations. For example each LAN may support several hundred end stations.

Also, for example, each LAN as shown in FIG. 4 and FIG. 5 could support different protocol types. For example, one of the LANs could support an IEEE 802.5 token ring, while another LAN could support an Ethernet IEEE 802.3 protocol. As a still further example, another LAN could support an ANSI/IEEE fiber distributed data interface, FDDI, communications protocol. For the purpose of the discussion concerning FIG. 4 and FIG. 5, any differences in protocol type will be ignored in order to focus on the present invention. However, the broxs will work in accordance with the present invention even though the different LANs support different protocol types.

Referring now to FIG. 5, LAN 180 has end station A 180A, and is connected by brox 182 to LAN 184. Each brox appears on the LAN to which it is connected as a station having a data link address. LAN 184 is shown supporting end station B 184B, and LAN 184 is connected by brox 186 to LAN 188. LAN 188 supports end station C 188C, and LAN 188 is connected by brox 190 to LAN 192. LAN 192 is shown supporting end station D 192D. Also, brox 194 is connected to LAN 192. Brox 194 may connect through ports, 195, 196, 197 to other links to provide a wide area network.

End station A 180A on LAN 180 transmits a data packet to end station D 192D on LAN 192. Operation of the various broxs 182, 186, 190, 194 will be discussed in accordance with the invention.

In this exemplary embodiment, each brox 182, 186, 190, 194 functions according to the rules 1, 2, 2a, and 3 set out hereinabove.

Typical protocols utilized in computer communication systems require that each end station periodically transmit a "hello" message on that end station's LAN. Each brox works as a router for the "hello" messages, and therefore does not transmit a "hello" message from a first LAN to a second LAN.

Figure 6A:
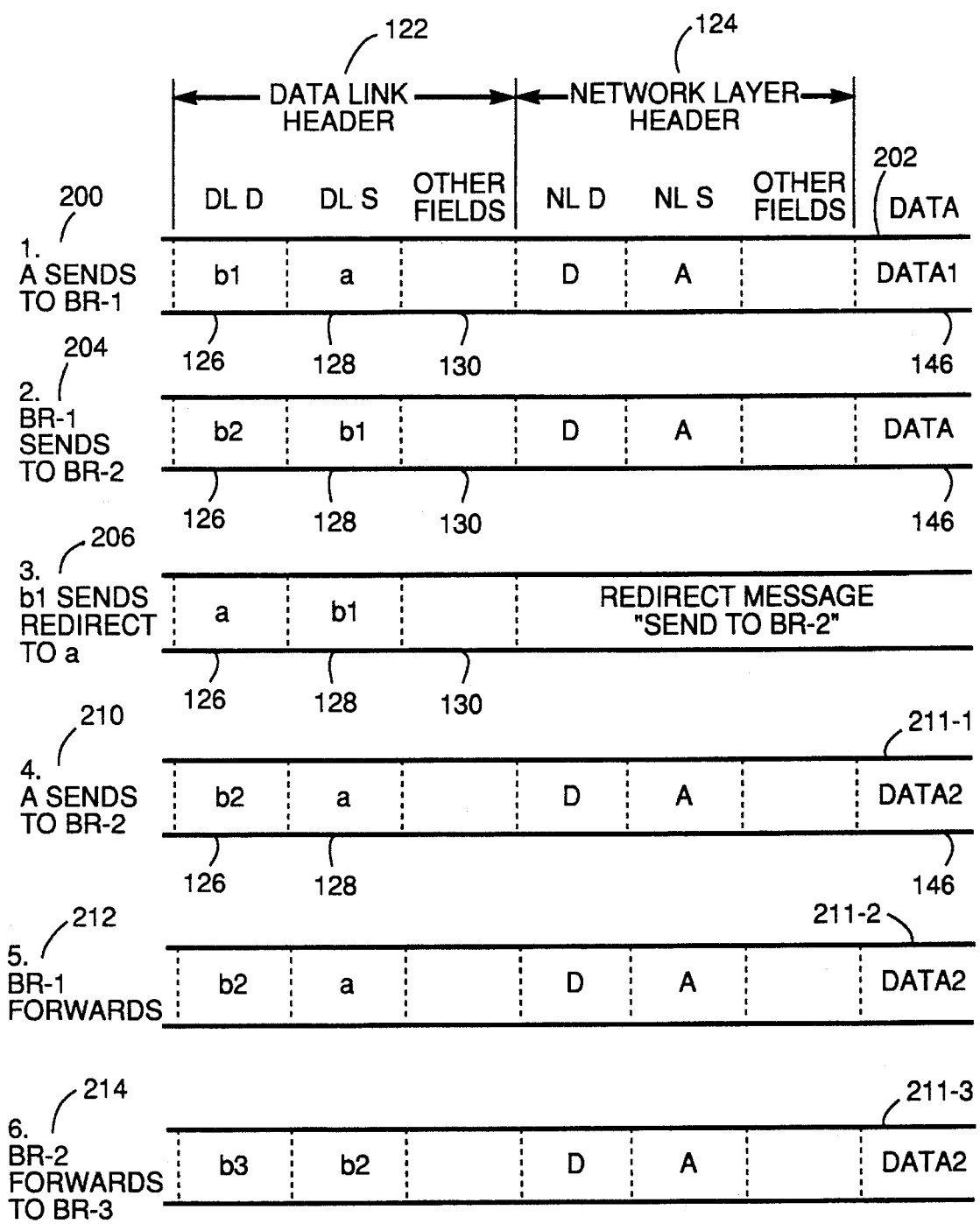
FIGS. 6A, 6B, 6C are a field diagram of a sequence of packets in accordance with the invention.
Figure 6B:
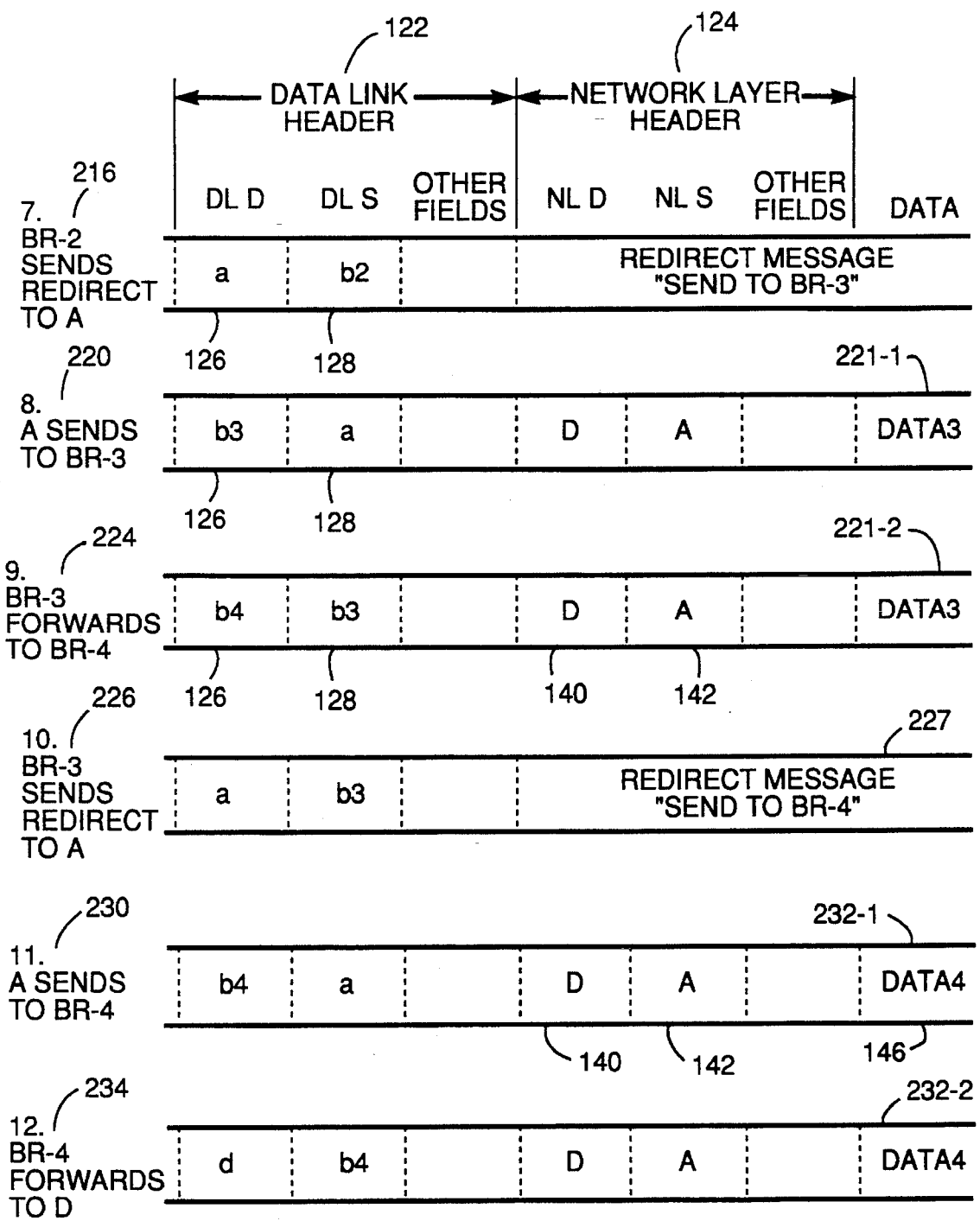
Figure 6C:
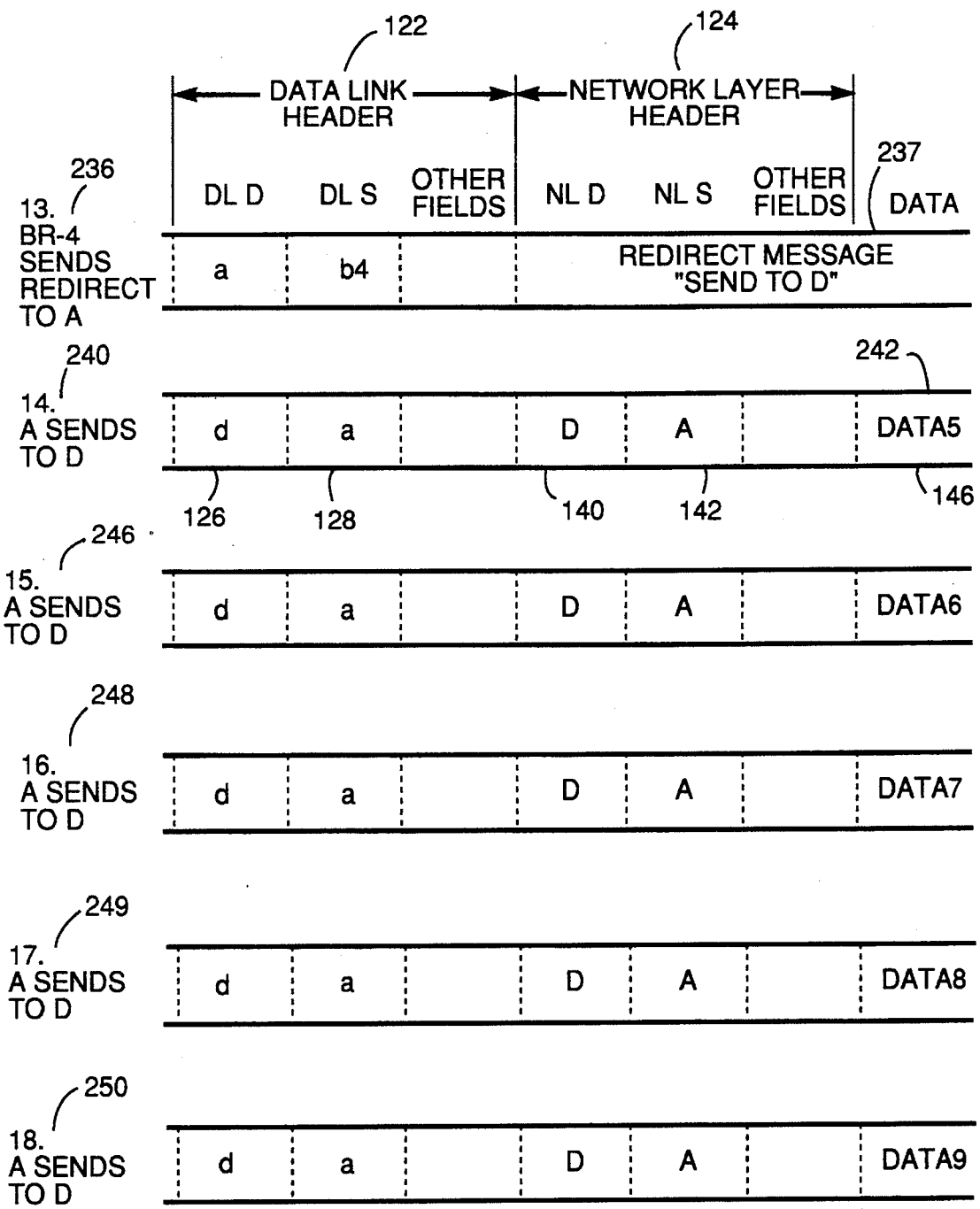

Further, ordinary and typical protocols for operation of computer communication systems require that each bridge or router transmit a "hello" message to all other bridges and routers in the system. The bridges and routers in the system then maintain a table of network layer addresses for each router or bridge. The router part and the bridge part of a brox each functions according the associated LAN protocols for a router or bridge, respectively. The events by which end station A 180A transmits a sequence of data packets to end station D 192D are set out in FIGS. 6A, 6B, 6C.

In event # 1 200 end station A 180A on LAN 180 transmits data packet 202-1, where the fields of data packet 202-1 contain the following: Data Link Destination Address field 126 contains b1, the data link address of brox-1 182; Data Link Source Address field 128 contains a, the data link address of end station A 180A; Network Layer Destination Address field 140 contains D; and Network Layer Source Address field 142 contains A. Data field 146 of data packet 202-1 contains data1, the data carried by data packet 202-1. The other fields 130 in the data link header and the other fields 144 in the network layer header are not further discussed in reference to FIG. 6 because attention is focused on the details of the present invention.

End station A 180A places b1 in Data Link Destination Address field 126 through an internal database of end station A 180A. The internal database of end station A 180A correlates the network layer address D of end station D 192D with brox-1 182, and the data link address of brox-1 182 is b1.

Brox-1 182 receives data packet 202-1 because the data link address b1 of brox-1.182 is contained in Data Link Destination Address field 126 as b1.

At event # 2 204 brox-1 182 follows Rule 1 hereinabove, and behaves as an ordinary router. Brox-1 182 transmits data packet 202-2 to brox-2 186, where the fields of data packet 202-2 contain the following: Data Link Destination Address field 126 contains b2, the data link address of brox-2 186; Data Link Source Address field 128 contains b1; Network Layer Destination Address field 140 contains D; and Network Layer Source Address field 142 contains A. Also, data field 146 of data packet 202-2 contains data1, and data1 was copied from data packet 202-1.

Brox-1 182 parses the Network Layer Header 124 and recovers from the Network Layer Destination Layer Address field 140 the network layer destination address D of end station D 192D. Brox-1 182 sends the data packet to brox-2 186 because a routing database internal to brox-1 182 correlates the network layer address D of end station D 192D with brox-2 186.

Brox-2 186 receives data packet 202-2 because the Data Link Destination Address field 126 of data packet 202-2 contains b2, the data link address of brox 186.

At event # 3 206 brox-1 182 transmits a redirect message packet 207 to end station A 180A. Redirect message packet 207 fields contain the following: Data Link Destination Address field 126 contains a, the data link address of end station A 180A; and, Data Link Source Address field 128 contains b1, the data link address of brox-1 182. The layout of the fields containing the redirect message depend upon the standard to which LAN 180 is designed. A redirect message, in accordance with some standard designs, may not have a network layer header, and so no network layer header fields are shown in redirect message packet 207. Alternatively, the redirect message packet 207 may, for example, have the standard form of an ISO standard 9542 redirect message, as discussed hereinabove in the section on routers.

End station A 180A receives the redirect message packet 207 because the Data Link Destination Address field 126 contains "a", the data link address of end station A 180A. The redirect message 207 is interpreted by end station A so that end station A stores, in an internal database, a correlation between the network layer address "D" of end station D 192D, and the data link address "b2" of brox 2 186.

The correlation between the data link address b2 of brox-2 186 and the network layer address for end station D 192D, as stored in end station A 180A, is then used by end station A 180A for the next packet that end station A 180A transmits to end station D 192D.

When data packet 202-2 is received by brox-2 186, brox-2 186 then notes that the Data Link Source Address field contains b1, a data link address of a brox, and Rule 2a takes effect. In accordance with Rule 2a, no redirect message is sent by brox-2 186. Data packet 202-2 will continue to be forwarded by the broxs functioning as ordinary routers, and the broxs will not send any redirect packets in correspondence with Rule 2a, hereinabove.

At event # 4 end station A sends a second data packet 211-1 to the network layer address of end station D 192D.

The fields of data packet 211-1 contain the following: Data Link Destination Address field 126 contains b2, the data link address of brox-2 186, where the correlation between end station D 192 D and brox-2 186 was learned by end station A 180A from the redirect message 207; Data Link Source Address field 128 contains a, the data link address of end station A 180A; Network Layer Destination Address field 140 contains D; and Network Layer Source Address field 142 contains A. Data field 146 of data packet 211-1 contains data2, the data carried by data packet 211-1.

End station A 180A places b2 in Data Link Destination Address field 126 as a result of redirect message 207. Brox-1 182 detects data packet 211-1, Rule 3 hereinabove takes effect, and brox-1 182 forwards data packet 211-1 by forwarding as a bridge. That is, brox-1 182 parses the Data Link Header 122, and because data packet 211-1 is not addressed to brox-1 182, brox-1 182 operates as a bridge to forward data packet 211-1 to LAN 184. Brox-1 does not parse the Network Layer Header 124 of data packet 211-1, in accordance with Rule 3 hereinabove.

At event # 5 212 brox-1 182 forwards, as a bridge, data packet 211-2 onto LAN 184 by placing: b2 in the Data Link Destination Address field 126; and a in the Data Link Source Address field 128. Data field 146 of data packet 211-2 contains data2, which was copied from data packet 211-1.

At event # 6 214 brox-2 186 receives data packet 211-2, Rule I hereinabove applies because the Data Link Destination Address field 126 contains b2, and so brox-2 186 forwards data packet 211-2 as a router. Accordingly, data packet 211-2 is forwarded onto LAN 188 as data packet 211-2 with the fields containing: Data Link Destination Address field contains b3; and, Data link Source Address field contains b2. Data field 146 of data packet 211-3 contains data2, which was copied from data packet 211-2.

Data packet 211-3 will be forwarded by brox-3 190 and brox-4 194 both operating as routers, until data packet 211-3 reaches its final destination, end station D 192D.

At event # 7 216 brox-2 sends a redirect message to end station A 180A, where the redirect message tells end station A to send data packets addressed to end station D 192D to the data link address b3.

At event # 8 220 end station A 180A sends a third data packet 221-1 to end station D, by placing in the fields of data packet 221-1 the following: Data Link Destination Address field b3; and, in the Data Link Source Address field a. Data field 146 of data packet 221-1 contains data3, the data carried by data packet 221-1.

At event # 9 224 brox-3 190 forwards data packet 221-1, as data packet 221-2, onto LAN 192. Fields of data packet 221-2 contain the following: Data Link Destination Address field 126 contains b4; and, Data Link Source Address field 128 contains b3. Data field 146 of data packet 221-2 contains data3, which was copied from data packet 221-1.

Brox-4 194 then forwards data packet 221-2 as a router, to end station D 192D. Also, rule 2a operates to prevent brox-4 194 from sending a redirect message because Data Link Source Address field 128 of data packet 221-2 contains b3, the address of brox-3 190.

At event # 10 226 brox-3 190 sends a redirect message 227 to end station A 180A. Redirect message 227 tells end station A 180A to send the next data packet directed to end station D 192D, that has the Network Layer Destination Address field contain D, to brox-4 194.

At event # 11 230 end station A 180A sends data packet 232-1 to brox-4 194. Field 146 of data packet 232-1 contains data4, data message 4. The fields of data packet 232-1 contain the following: Data Link Destination Address field 126 contains b4; Data Link Source Address field 128 contains a; Network Layer Destination Address field 140 contains D; and, Network Source Address field 142 contains A.

Data packet 232-1 is forwarded by brox-1 182, brox-2 186, and brox-3 190 all behaving as bridges, in response both to Rule 3 hereinabove and the Data Link Destination Address field 126 of data packet 232 containing b4.

At event # 12 234 brox-4 194 then forwards data packet 232-1 as a router, and the data packet becomes data packet 232-2. The Data Link Destination field 126 of data packet 232-2 contains d. Data field 146 of data packet 232-2 contains data4, copied from data packet 232-1, as forwarded.

At event # 13 236 brox-4 194 sends a redirect message 237 to end station A 180A, where the redirect message tells end station A 180A to send the next data packet for end station D 192D with a Data Link Destination Address field containing d, the data link address of end station D 192D.

At event # 14 240 end station D 180A sends a fifth data packet 242 to end station D 192D. The fields of data packet 242 contain the following: Data Link Destination Address field 126 contains d; Data Link Source Address field 128 contains a; Network Layer Destination Address field 140 contains D; Network Source Layer field 142 contains A; and, data field 146 contains data5, the fifth set of data.

Data packet 242 is forwarded by the broxs functioning as bridges in response to Rule 3 hereinabove and the presence of d in the Data Link Destination Address field of data packet 242. That is, brox-1 182, brox-2 186, brox-3 190, and brox-4 194 each forward data packet 242 by each brox functioning as a bridge.

Successive data packets are transmitted from end station A 180A to end station D 192D with the data link address d of end station D 192D in the Data Link Destination Address field of the packet. Event # 15 246, event # 16 248, event # 17 249, and event # 18 250 all represent data packets sent by end station A 180A to end station D 192D. And data packets of event 15, 16, 17, and 18 are all forwarded by brox-1 182, brox-2 186, brox-3 190, and brox-4 194 functioning as bridges.

THIRD EXEMPLARY EMBODIMENT

The rules used hereinabove for forwarding a packet are the rules that apply to traditional bridges and routers. The traditional rules for a router include the following rule: "The Data Link Source Address field of a forwarded packet always contains the data link address of the forwarding device". This rule was used hereinabove, for example in FIG. 6A at step 2 204, where Data Link Source Address field 128 contains b1, the data link address of the forwarding brox where the brox functioned as a router. Also, at step 5 212 the Data Link Source Address field 128 contains b1, where the packet 211-2 was forwarded by brox-1 functioning as a bridge.

In this third exemplary embodiment the brox will not obey the above rule, but will place the data link address of the originating end station in the Data Link Source Address field of each data packet that the brox forwards as a router. Forwarding by the brox as a bridge retains the traditional bridge forwarding protocol. By always placing the data link address of the originating end station, for example, end station A 180A in FIG. 6A, in the Data Link Source Address field of the forwarded packet, one data packet sent by the originating end station A 180A to a receiving end station D 192D will generate a redirect message from each intermediate brox. Consequently, after one data packet traverses all of the hops to the receiving end station, the redirect messages will have informed the sending end station of the data link address of the receiving end station. The next data packet transmitted by the sending end station will then contain the data link address of the receiving end station in the Data Link Source Address field of the data packet. The second data packet will then be forwarded by all intermediate broxs functioning as bridges.

This Third Exemplary Embodiment is a compromise between traditional bridge and traditional router protocols. Traditionally, a bridge always forwards packets without changing either the data link source address or the data link destination address of the packet. Traditionally, a router always changes both data link destination and source addresses. The router places its own data link address in the packet Data Link Source Address field, and the router places the destination address of the next hop in the packet Data Link Destination Address field. A brox using this third exemplary embodiment takes the intermediate course of changing the packet Data Link Destination Address field, but in not changing the packet Data Link Source Address field.

The invention, in all embodiments, has the beneficial effect that it speeds forwarding of data packets and so avoids congestion in the data communications system.

A further benefit of the invention is that, in the event that an intermediate forwarding station is an old style router that does not change into a bridge in accordance with the Rules of the invention hereinabove, the invention will work perfectly well with all of the intermediate broxs functioning in accordance with the invention. Any intermediate "old style" routers already installed in an old system will not interfere with the improvements gained from new broxs added to the system.

A still further benefit of the invention is that implementation of the invention requires no change in end stations. The invention makes use of old functionality of end stations in a new and novel way, and so may beneficially be installed in an existing system without requiring any change to existing end stations.

Accordingly, the invention greatly improves the speed at which a message is forwarded over multiple links of a complex communications system.

It is to be understood that the above described embodiments are simply illustrative of the principles of the invention. Various other modifications and changes may be made by those skilled in the art which embody the principles of the invention and fall within the spirit and scope thereof.

What is claimed is:

1. A packet forwarding apparatus, physically coupled with a plurality of LANs by a corresponding plurality of ports, comprising:

receiving means for receiving a first packet from a first one of said plurality of ports, said first one of said plurality of ports coupled;

packet discarding means, responsive to said receiving means, for discarding said first packet when said first one of said plurality of ports is not within a spanning tree of the apparatus, said spanning tree of the apparatus containing a list indicating which of said plurality of ports are active;

learning means, responsive to said packet discarding means not discarding said first packet, for storing a data link source address of said first packet in a forwarding database for said first LAN;

testing means, responsive to said learning means, for determining if a data link destination address field value of said first packet is equal to either a data link address of said apparatus, or to a routing multicast address;

router processing means, responsive to said testing means determining that said data link destination address field value of said first packet is equal to either a data link address of said apparatus or to a routing multicast address, for forwarding said first packet based on addressing information in a network layer header and a data link header in said first packet; and bridge processing means, responsive to said testing means determining said data link destination address field value of said first packet is not equal to either a data link address of said apparatus or to a routing multicast address, for forwarding said first packet based on addressing information in a data link header in said first packet.

2. The apparatus as in claim 1, said router processing means further comprising:

a second testing means, for determining if said first packet is a forwardable data packet;

internal processing means, responsive to said second testing means, for processing said first packet within said apparatus, and not forwarding said first packet, when said first packet is not a forwardable data packet;

selecting means, responsive to said second testing means determining said first packet is a forwardable packet, for selecting a second one of said plurality of LANs and a data link address, said data link address selected based on a network layer destination address within said first packet;

redirect packet transmitting means, responsive to said selecting means, for transmitting a redirect packet onto said first one of said plurality of ports, said redirect packet having a data link destination address field equal to a data link source address field of said first packet; and packet forwarding means, responsive to said selecting means, for writing said selected data link layer address to said data link layer destination address field of said first packet, and for forwarding said first packet onto a second one of said plurality of ports, said second one of said plurality of ports coupled with said second one of said plurality of LANs.

3. The apparatus as in claim 2, said redirect packet transmitting means further comprising:

means for inhibiting transmission of said redirect packet when said data link source address field of said first packet is equal to a data link address of a forwarding apparatus.

4. The apparatus as in claim 2, said packet forwarding means further comprising:

means for writing said data link address of said apparatus to said data link source address field of said first packet.

5. The apparatus as in claim 2, said redirect packet transmitting means inhibiting transmission of said redirect packet when said second one of said plurality of ports is not within the spanning tree of the apparatus.

6. The apparatus as in claim 1, said bridge processing means further comprising:

destination address checking means for determining if said data link destination address field value of said first packet is contained in a forwarding database within said apparatus;

flooding means, responsive to said destination address checking means determining said data link destination address field value of said first packet is not contained in said forwarding database within said apparatus, for transmitting said first packet onto all of said plurality of ports in said spanning tree of said apparatus, except said first one of said plurality of ports;

link comparison means, responsive to said destination address checking means determining said data link destination address field value of said first packet is contained in said forwarding database within said apparatus, for determining if a second one of said plurality of ports is equal to said first one of said plurality of ports, said second one of said plurality of ports associated with said data link destination address field value of said first packet;

a second packet discarding means, responsive to said link comparison means determining said second one of said plurality of ports is equal to said first one of said plurality of ports, for discarding said first packet; and a second packet forwarding means, responsive to said link comparison means determining said second one of said plurality of ports is not equal to said first one of said plurality of ports, for transmitting said first packet onto said second one of said plurality of ports.

* * * * *